(12) United States Patent
Maier et al.

(10) Patent No.: US 7,937,552 B2
(45) Date of Patent: May 3, 2011

(54) CACHE LINE RESERVATIONS

(75) Inventors: Daryl James Maier, Unionville (CA); Marcel Mitran, Markham (CA); Vijay Sundaresan, North York (CA)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 11/943,252

(22) Filed: Nov. 20, 2007

(65) Prior Publication Data
US 2009/0132780 A1 May 21, 2009

(51) Int. Cl.
*G06F 12/00* (2006.01)
(52) U.S. Cl. .................................................. 711/173
(58) Field of Classification Search .................. None
See application file for complete search history.

(56) References Cited

U.S. PATENT DOCUMENTS

| | | | |
|---|---|---|---|
| 6,321,240 B1 | 11/2001 | Chilimbi et al. | |
| 6,848,026 B2 * | 1/2005 | DeSota et al. | 711/129 |
| 2006/0259691 A1 | 11/2006 | Jeremiassen | |

FOREIGN PATENT DOCUMENTS

EP       1363193 A1    11/2003

* cited by examiner

*Primary Examiner* — Hiep T Nguyen
(74) *Attorney, Agent, or Firm* — Yee & Associates, P.C.; David A. Mims, Jr.

(57) ABSTRACT

Illustrative embodiments provide a computer implemented method, an apparatus in the form of a data processing system and a computer program product for cache line reservations. In one embodiment, the computer implemented method comprises, dividing a memory into an unreserved section and a set of reserved sections. The method performs selected allocations of the memory only from the set of reserved sections, and performing un-selected allocations of the memory from the unreserved section. The method further mapping a specified selected allocation of the memory to a same corresponding line of cache memory each time the mapping for the specified selected allocation of the memory occurs, thereby maintaining locality.

18 Claims, 13 Drawing Sheets

```
label start-allocate:
if (tlhAlloc + s <= tlhEnd)
      {
      requested = tlhAlloc;              }1002
      tlhAlloc = tlhAlloc + s;
      return requested;
      }
else
{                   1004
if (S <= tlhSize)
                                1006
         request a new TLH and go to label start- allocate;
     else
         allocate large request from non-TLH memory area;
                                          1008
```

*FIG. 10*

1100 unreservedProportion + reservedProportion[0] +
reservedProportion[1] +
reservedProportion[maxReservedTlhSections-1] = 1.  } 1102

(tlhEnd - tlhStart)/chunkSize = numchunks (number of chunks ← 1104
within a thread-local heap)

chunkSize/lineSize = numLines (number of cache lines within a ← 1106
chunk)

reservedProportion[n]*chunkSize = reservedchunkSize[n] (amount of } 1108
memory within a chunk reserved for allocation space n, where n
ranges from 0...maxReservedTlhSections-1)

unreservedProportion*chunkSize = unreservedchunkSize (amount of } 1110
memory within a chunk for unreserved allocations)

chunkSize - unreservedchunkSize = totalReservedchunkSize ← 1112 reservedTlhStart[n] = reservedTlhAlloc[n] =
reservedTlhStart[n-1] + (chunkSize * reservedProportion[n-
1]) where n is from l...maxReservedTlhSections-1.  } 1114 reservedTlhLinesLow = 0 = unreservedTlhLinesHigh + 1
reservedTlhLinesHigh [0] = unreservedTlhLinesHigh t
reservedProportion [0] *numLines reservedTlhLinesLow [n] = reservedTlhLinesHigh [n-l] + 1
reservedTlhLinesHigh [n] = reservedTlhLinesHigh [n-l] +
reservedProportion [n] *numLines where n varies from
l...maxReservedTlhSections-1.  } 1116

*FIG. 11*

```
label start_unreserved_allocate :
if (unreservedTlhAlloc + s <= unreservedTlhEnd)
        {
        requested = unreservedTlhAlloc;
        unreservedTlhAlloc = unreservedTlhAlloc + s;
        return requested;
        }
Else
        {
        if (s > unreservedchunkSize)
        {
        // allocate with cache pollution over the reserved sections
        //
        if (unreservedTlhStart + s > tlhEnd)
                {
                // Object will not fit in the current thread-local
                heap
                //
                request a new thread-local heap
                }
```

⎫
⎬ 1202
⎭

⎫
⎪
⎪
⎬ 1204
⎪
⎪
⎭

```
requested = unreservedTlhAlloc
unreservedTlhAlloc = unreservedTlhAlloc + s;
// Adjust the thread-local heap pointers of all reserved
// sections that may now be covered by this polluting
// allocation.
//
newChunkBase = unreservedTlhAlloc & (-chunksize)
allocOffset = unreservedTlhAlloc & (chunksize - 1 )
// If the allocation pointer ends up outside of the cache
// lines of the unreserved section then adjust to be within
// the allowed range.
//
```

```
if ( allocOffset > unreservedTlhLinesHigh)
    {
    unreservedTlhAlloc = newChunkBase + chunkSize
    if (unreservedTlhAlloc > tlhEnd)
        {
        unreservedTlhTop = tlhEnd
        }
    else
        {
        unreservedTlhTop = unreservedTlhAlloc +
    unreservedchunkSize
        }
    }
else
    {
    unreservedTlhAlloc = newChunkBase
    unreservedTlh Top − newChunkBase + unreservedChunkSize
    }
for n = 0 to numActiveReservedTlhSections-1
    {
    if ( allocOffset > = reservedTlhLinesLow[n])
        {
        reservedTlhAlloc[n] = newChunkBase + chunkSize +
        reservedTlhLinesLow[n]
        if (reservedTlhAlloc[n] > tlhEnd)
          {
          reservedTlhTop[n} = tlhEnd
          }
        else
            {
            reservedTlhTop[n] = reservedTlhAlloc[n] +
        reservedTlhLinesHigh[n]
            }
        }
    else
        {
        reservedTlhAlloc[n] = newChunkBase +
        reservedTlhLinesLow[n]
        reservedTlhTop[n] = newChunkBase +
        reservedTlhLinesHigh[n]
        }
    }
}
```

```
        else
                {
                if (unreservedTlhStart + chunkSize <
tlhEnd)
                        {
                        unreservedTlhStart =
                        unreservedTlhStart + chunkSize;
                        unreservedTlhAlloc =
                unreservedTlhStart;
                        unreservedTlhEnd =
                        unreservedTlhStart +
                        unreservedchunkSize;
                        goto label
                start_unreserved_allocate;
                        }
                else
                        {
                        if (s < = tlhSize)
                                request a new thread-local
                        heap and goto label
                        start_unreserved_allocate;
                        else
                                allocate large request
                        from non-thread-local heap
                        memory area;
                        }
                }
        }
```

```
label start_reserved_allocate :
if (reservedTlhAlloc[n] + s <= reservedTlhEnd[n])
        {
        requested = reservedTlhAlloc[n];                            } 1302
        reservedTlhAlloc[n] = reservedTlhAlloc[n] + s;
        return requested;
        }

Else
        {
        if (reservedTlhStart[n] + reservedchunkSize[n]
< tlhEnd)
                {
        reservedTlhStart [n] = reservedTlhStart[n] +
chunkSize;                                                          } 1304
        reservedTlhAlloc[n] = reservedTlhAlloc[n];
        reservedTlhEnd[n] = reservedTlhStart[n] +
        reservedchunkSize[n];
        goto label start_reserved_allocate;
        } else
                {
                if (s <= tlhSize)
                        request a new thread-local heap and gotolabel    } 1306
                start_reserved_allocate;
                else
                        allocate large request from non-thread-local heap } 1308
                memory area;
                }
        }
```

*FIG. 13*

CACHE LINE RESERVATIONS

BACKGROUND OF THE INVENTION

1. Field of the Invention

The present invention relates generally to an improved data processing system, and in particular to a computer implemented method, an apparatus and a computer program product for cache line reservations.

2. Description of the Related Art

It is common in programming models like Java to instantiate an object and invoke method(s) on the object in order to perform even a relatively simple computational task. Thus, in order to complete complex transactions, modern server and middleware applications typically create a very large number of objects, many of which are only used for a short duration. For example, a short lived object may be an object instantiated to hold a transaction or operation value temporarily in the form of an intermediate result of a calculation. After the completion of a calculation step the value is no longer needed and discarded. Such objects may be created and discarded many times during a session. In many cases, the majority of objects are short lived objects.

Locality of reference is a principle in which computer programs usually and repeatedly access data related either spatially or temporally. In other words, if the program accesses a certain memory location M, it can be expected that the same program would access some other memory location close to memory location M soon. The probability of a certain memory location being accessed several times in a relatively short duration increases if the memory location has been accessed before.

A processor cache is used by the central processing unit of a computer to reduce the average time to access memory. The cache is a smaller, faster memory which stores copies of the data from the most frequently used main memory locations. When the processor wishes to read or write a location in main memory, it first checks whether that memory location is in the cache. This is accomplished by comparing the address of the memory location to all the locations in the cache that might contain that address. If the processor finds that the memory location is in the cache, this is referred to as a cache hit and if it could not find it in the cache, it is called a cache miss. In the case of a cache hit, the processor immediately reads or writes the data in the cache line. If a program behaves in accordance with the locality of reference principle, most memory accesses would be to cached memory locations and so the average latency of memory accesses will be closer to the cache latency than to the latency of main memory.

Addresses in both kinds of memory, main and cache, can be considered to be divided into cache lines. A cache line refers to a contiguous range of addresses where the size of the range varies on different computer architectures, for example from 8 bytes to 512 bytes. The size of the cache line is typically larger than the size of the usual access requested by a central processing unit (CPU) instruction, which usually ranges from 1 to 16 bytes.

When a memory access is to a location that is not found in the cache, the entire cache line that the location belongs to is read from main memory and brought to the cache memory. The previous data that was in the cache line in the cache memory is evicted from the cache and so future accesses to that data would have to access main memory.

A cache line replacement policy decides where in the cache a copy of a particular entry of main memory will be placed. If the replacement policy is free to choose any entry location in the cache to hold the copy, the cache is referred to as fully associative. At the other extreme, if each entry in main memory can be mapped into just one respective place in the cache, the cache is then referred to as being direct mapped. Many caches implement a compromise, wherein the compromise is described as set associative.

For example, an N-way set associative defines that any particular location in main memory can be cached in one of N entries in the cache memory. The simplest and most commonly used scheme to decide the mapping of a memory location to cache location(s) is to use the least significant bits of the memory location's address as the index for the cache memory, and to have N entries for each cache location.

In programs that create a large number of objects, and thereby a large working set, performance can be highly dependent on the cost of accessing memory. Modern Java Virtual Machines (JVM) employ sophisticated memory allocation and management techniques to increase data locality by laying out objects in memory, such that cache misses are reduced, thereby ensuring data being accessed is available in cache memory most of the time.

Memory allocation is usually performed by native code generated on the fly by just-in-time (JIT) compilers, whereas memory management is handled by the garbage collector (GC). Previous efforts in reducing the overhead of object allocation were directed toward use of a specific thread-local heap (TLH) when allocating objects from a specific thread. Use of the thread local heap was primarily aimed at eliminating the need for synchronization at every allocation in the presence of multiple threads, as would be the case if there was one heap allocation area for all threads, by assigning a chunk of memory for exclusive use by a thread. Allocation of selected objects from a different portion of the memory has also been tried. For example, the partitioning of the entire heap into multiple heaps, where each of the heaps was used for some selected objects.

Many efforts are directed towards improving object layout through use of the garbage collector to move related objects closer together to improve object locality. Several schemes have been proposed that ensure that objects accessed within a short duration of each other are laid out as close as possible in memory. The garbage collector changes the layout of objects to improve locality in a separate phase but does not affect how objects are allocated initially. Garbage collectors usually perform work in cycles whereas the time between cycles, can and usually does, allow for many allocations.

Some of these allocations might result in short lived objects that are discarded before the next garbage collection cycle, therefore it would be too late for garbage collection to do anything meaningful with the expired object apart from reclaiming the memory, which would not affect cache locality. Therefore there is a need to reduce cache misses; by ensuring data being accessed is available in cache memory most of the time.

SUMMARY OF THE INVENTION

Illustrative embodiments provide a computer implemented method, an apparatus and a computer program product for cache line reservations.

In one embodiment, a computer implemented method comprises dividing a memory into an unreserved section and a set of reserved sections, performing selected allocations of the memory only from the set of reserved sections, performing un-selected allocations of the memory from the unreserved section, and mapping a specified selected allocation of the memory to a same corresponding line of the cache memory each time the mapping for the specified selected allocation of the memory is performed.

In another embodiment, an apparatus takes the form of a data processing system for managing a cache memory, the data processing system comprising, a bus, a memory connected to the bus, a storage device connected to the bus, wherein the storage device contains computer executable program code. A processor unit is connected to the bus, wherein the processor unit executes the computer executable program code to, divide the memory into an unreserved section and a set of reserved sections, perform selected allocations of the memory only from the set of reserved sections, perform unselected allocations of the memory from the unreserved section, and map a specified selected allocation of the memory to a same corresponding line of the cache memory each time the mapping for the specified selected allocation of the memory is performed.

In other embodiments, a computer program product comprises a computer usable recordable medium having computer executable program code embodied thereon. The computer executable program code comprises computer executable program code for dividing a memory into an unreserved section and a set of reserved sections, computer executable program code for performing selected allocations of the memory only from the set of reserved sections, computer executable program code for performing un-selected allocations of the memory from the unreserved section, and computer executable program code for mapping a specified selected allocation of the memory to a same corresponding line of the cache memory each time the mapping for the specified selected allocation of the memory is performed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 10 is a pseudo-code example of a typical allocation;

FIG. 11 is a pseudo-code example of allocation definitions in accordance with an illustrative embodiment;

FIGS. 12A, 12B and 12C are a pseudo-code example of an unreserved allocation in accordance with an illustrative embodiment; and FIG. 13 is a pseudo-code example of a reserved allocation in accordance with an illustrative embodiment.

DETAILED DESCRIPTION OF THE PREFERRED EMBODIMENT

Figure 1:
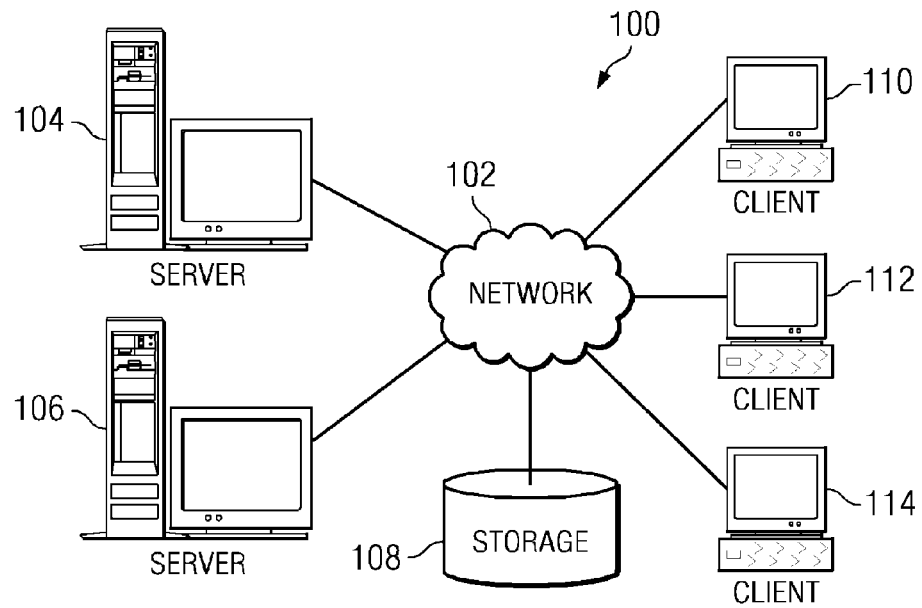
FIG. 1 is a pictorial representation of a network of data processing systems in which illustrative embodiments may be implemented.
Figure 2:
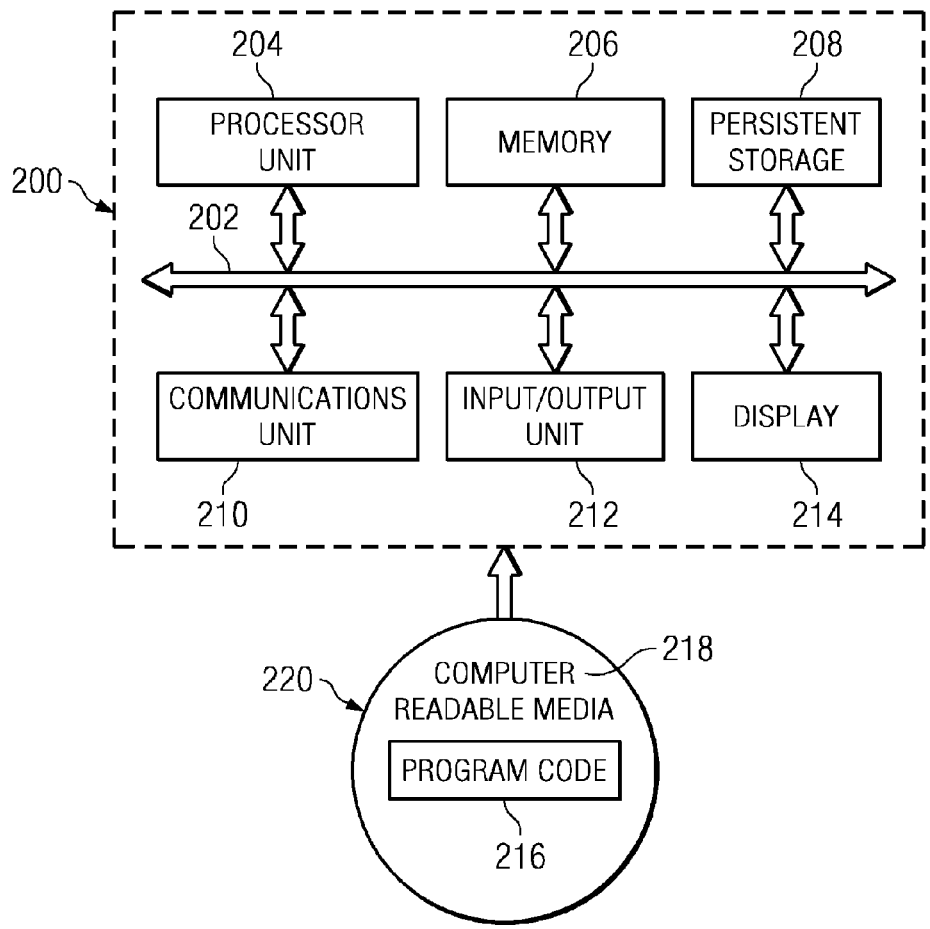
FIG. 2 is a block diagram of a processor of the data processing system of FIG. 1 for processing information in accordance with illustrative embodiments.
Figure 3:
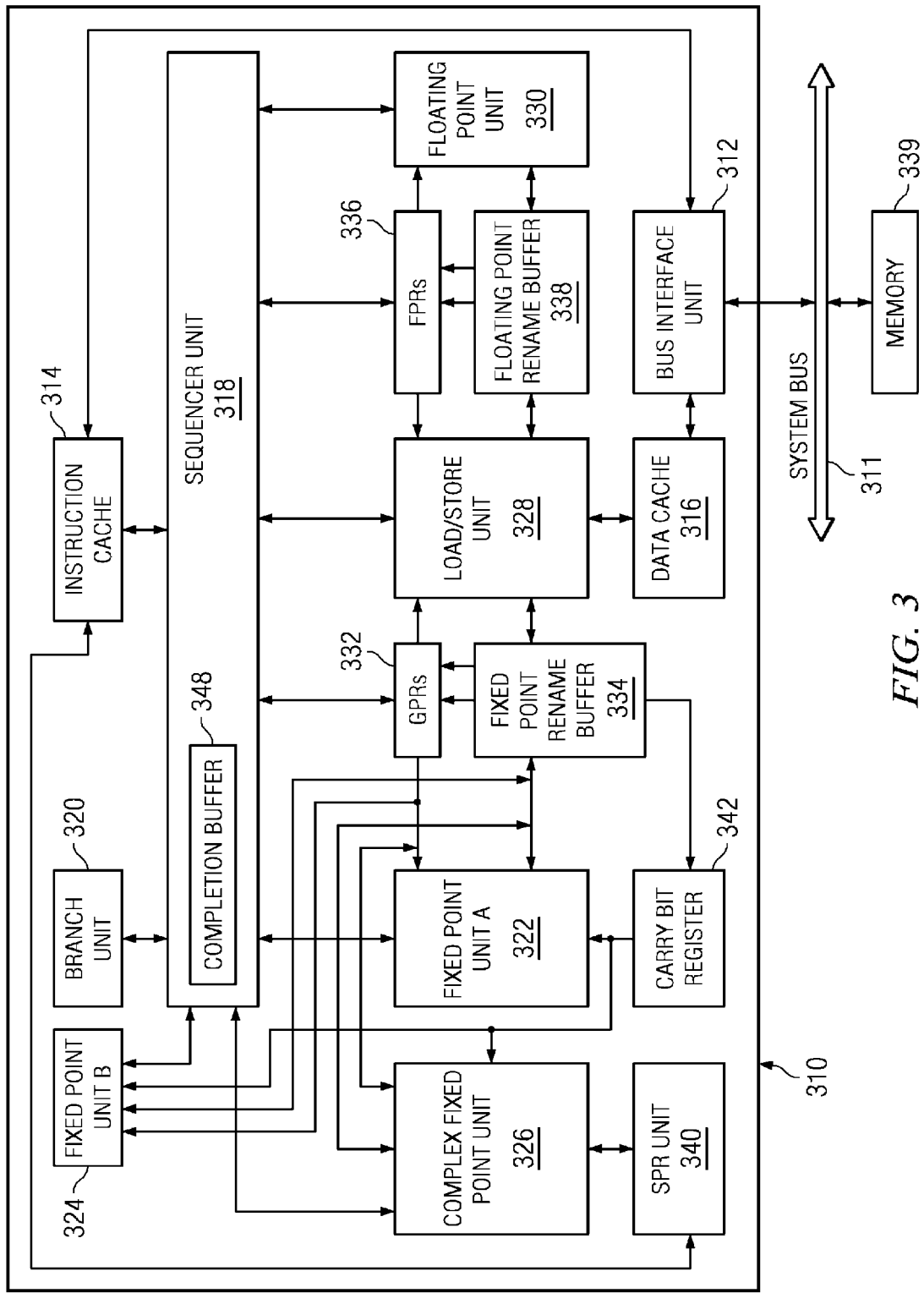
FIG. 3 is a block diagram of details of the processor of the data processing system of FIG. 2 for processing information in accordance with illustrative embodiments.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Cache allocation, as further described, may improve the performance of a network of computers as shown in FIG. 1. For example, improvements in response times may be achieved by reducing the occurrence of cache misses in cache memory of server 106, when accessed by clients 110 and 112, through the disclosed, improved, allocations of cache memory.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

With reference to FIG. 3, a block diagram of a processor of the data processing system of FIG. 2 for processing information in accordance with an illustrative embodiment is shown. Illustrative embodiments of the present invention utilize a cache, such as data cache 316 and a memory, such as memory 339. The memory is divided into an unreserved section for un-selected allocation and a set of reserved sections containing one or more sections for only selected allocations.

The selected allocations are directed toward specific locations, in that these allocations are only performed from the designated reserved sections. A specified selected allocation of the memory is then mapped to a same corresponding line of the cache each time the mapping for the specified selected allocation of the memory occurs. The directed allocations aid in maintaining locality of related data. The un-selected allocations are performed using any location of the remaining unreserved section. The un-selected allocations are not directed and therefore do not maintain the same locality of reference that is managed for the selected allocations.

Processor 310 is an example of a central processing unit or processor of a data processing system, in which computer usable program code or instructions implementing the processes may be located in accordance with illustrative embodiments. Processor 310 is shown as a single integrated circuit superscalar microprocessor in an illustrative embodiment. Accordingly, as discussed further herein below, processor 310 includes various units, registers, buffers, memories, and other sections, all of which are formed by integrated circuitry. Also, in an illustrative embodiment, processor 310 operates according to reduced instruction set computer ("RISC") techniques. As shown in FIG. 3, a system bus 311 is connected to a bus interface unit ("BIU") 312 of processor 310. BIU 312 controls the transfer of information between processor 310 and system bus 311.

BIU 312 is connected to an instruction cache 314 and to a data cache 316 of processor 310. Instruction cache 314 outputs instructions to a sequencer unit 318. In response to such instructions from instruction cache 314, sequencer unit 318 selectively outputs instructions to other execution circuitry of processor 310.

In addition to sequencer unit 318, in the preferred embodiment, the execution circuitry of processor 310 includes multiple execution units, namely a branch unit 320, a fixed-point unit A ("FXUA") 322, a fixed-point unit B ("FXUB") 324, a complex fixed-point unit ("CFXU") 326, a load/store unit ("LSU") 328, and a floating-point unit ("FPU") 330. FXUA 322, FXUB 324, CFXU 326, and LSU 328 input their source operand information from general-purpose architectural registers ("GPRs") 332 and fixed-point rename buffers 334. Moreover, FXUA 322 and FXUB 324 input a "carry bit" from a carry bit ("CA") register 342. FXUA 322, FXUB 324, CFXU 326, and LSU 328 output results (destination operand information) of their operations for storage at selected entries in fixed-point rename buffers 334. Also, CFXU 326 inputs and outputs source operand information and destination operand information to and from special-purpose register processing unit ("SPR unit") 340.

FPU 330 inputs its source operand information from floating-point architectural registers ("FPRs") 336 and floating-point rename buffers 338. FPU 330 outputs results (destination operand information) of its operation for storage at selected entries in floating-point rename buffers 338.

In response to a Load instruction, LSU 328 inputs information from data cache 316 and copies such information to selected ones of rename buffers 334 and 338. If such information is not stored in data cache 316, then data cache 316 inputs (through BIU 312 and system bus 311) such information from a system memory 339 connected to system bus 311. Moreover, data cache 316 is able to output (through BIU 312 and system bus 311) information from data cache 316 to system memory 339 connected to system bus 311. In response to a Store instruction, LSU 328 inputs information from a selected one of GPRs 332 and FPRs 336 and copies such information to data cache 316.

Sequencer unit 318 inputs and outputs information to and from GPRs 332 and FPRs 336. From sequencer unit 318, branch unit 320 inputs instructions and signals indicating a present state of processor 310. In response to such instructions and signals, branch unit 320 outputs (to sequencer unit 318) signals indicating suitable memory addresses storing a sequence of instructions for execution by processor 310. In response to such signals from branch unit 320, sequencer unit 318 inputs the indicated sequence of instructions from instruction cache 314. If one or more of the sequence of instructions is not stored in instruction cache 314, then instruction cache 314 inputs (through BIU 312 and system bus 311) such instructions from system memory 339 connected to system bus 311.

In response to the instructions input from instruction cache 314, sequencer unit 318 selectively dispatches the instructions to selected ones of execution units 320, 322, 324, 326, 328, and 330. Each execution unit executes one or more instructions of a particular class of instructions. For example, FXUA 322 and FXUB 324 execute a first class of fixed-point mathematical operations on source operands, such as addition, subtraction, ANDing, ORing and XORing. CFXU 326 executes a second class of fixed-point operations on source operands, such as fixed-point multiplication and division. FPU 330 executes floating-point operations on source operands, such as floating-point multiplication and division.

As information is stored at a selected one of fixed point rename buffers 334, such information is associated with a storage location (e.g. one of GPRs 332 or CA register 342) as specified by the instruction for which the selected rename buffer is allocated. Information stored at a selected one of fixed point rename buffers 334 is copied to its associated one of GPRs 332 (or CA register 342) in response to signals from sequencer unit 318. Sequencer unit 318 directs such copying of information stored at a selected one of fixed point rename buffers 334 in response to "completing" the instruction that generated the information. Such copying is called "writeback."

As information is stored at a selected one of floating point rename buffers 338, such information is associated with one of FPRs 336. Information stored at a selected one of floating point rename buffers 338 is copied to its associated one of FPRs 336 in response to signals from sequencer unit 318. Sequencer unit 318 directs such copying of information stored at a selected one of floating point rename buffers 338 in response to "completing" the instruction that generated the information.

Processor 310 achieves high performance by processing multiple instructions simultaneously at various ones of execution units 320, 322, 324, 326, 328, and 330. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 318 selectively inputs (from instruction cache 314) one or more instructions from one or more memory addresses storing the sequence of instructions discussed further hereinabove in connection with branch unit 320, and sequencer unit 318. In the decode stage, sequencer unit 318 decodes up to four fetched instructions.

In the dispatch stage, sequencer unit 318 selectively dispatches up to four decoded instructions to selected (in response to the decoding in the decode stage) ones of execution units 320, 322, 324, 326, 328, and 330 after reserving rename buffer entries for the dispatched instructions' results (destination operand information). In the dispatch stage, operand information is supplied to the selected execution units for dispatched instructions. Processor 310 dispatches instructions in order of their programmed sequence.

In the execute stage, execution units execute their dispatched instructions and output results (destination operand information) of their operations for storage at selected entries in fixed point rename buffers 334 and floating point rename buffers 338 as discussed further hereinabove. In this manner, processor 310 is able to execute instructions out-of-order relative to their programmed sequence.

In the completion stage, sequencer unit 318 indicates an instruction is "complete." Processor 310 "completes" instructions in order of their programmed sequence.

In the writeback stage, sequencer 318 directs the copying of information from rename buffers 334 and 338 to GPRs 332 and FPRs 336, respectively. Sequencer unit 318 directs such copying of information stored at a selected rename buffer. Likewise, in the writeback stage of a particular instruction, processor 310 updates its architectural states in response to the particular instruction. Processor 310 processes the respective writeback stages of instructions in order of their programmed sequence. Processor 310 advantageously merges an instruction's completion stage and writeback stage in specified situations.

In illustrative embodiments, each instruction requires one machine cycle to complete each of the stages of instruction processing. Nevertheless, some instructions (e.g., complex fixed-point instructions executed by CFXU 326) may require more than one cycle. Accordingly, a variable delay may occur between a particular instruction's execution and completion stages in response to the variation in time required for completion of preceding instructions.

A completion buffer 348 is provided within sequencer 318 to track the completion of the multiple instructions which are being executed within the execution units. Upon an indication that an instruction or a group of instructions have been completed successfully, in an application specified sequential order, completion buffer 348 may be utilized to initiate the transfer of the results of those completed instructions to the associated general-purpose registers.

In an illustrative embodiment of the present invention utilizing the described cache, such as data cache 316 and memory, such as memory 339 of FIG. 3, the memory is divided into an unreserved section and a set of reserved sections. The set of reserved sections can be one or more sections. Selected allocations of the memory are only allocated from the set of reserved sections, and un-selected allocations of the memory allocated from the unreserved section. A specified selected allocation of the memory is then mapped to a same corresponding line of the cache memory each time the mapping for the specified selected allocation of the memory occurs, thereby maintaining locality With reference to FIG. 4, a block diagram of a portion of hardware and software components of the data processing system of FIG. 2 in accordance with illustrative embodiments is shown. Within system 200, memory 206 and persistent storage 208 of FIG. 2, are shown relative to instruction cache 314 and data cache 316 of FIG. 3 with the addition of compiler 402, application 404 and garbage collector 406. System 200 causes instructions and data to be moved into memory 206 for processing from instruction cache 314 and data cache 316 respectively. Frequently referenced application data may be moved between memory 206 and data cache 316 as needed. Larger quantities and less frequently used application data as well as application instructions may be further located on persistent storage 208 to be called upon as needed. Garbage collector 406 performs maintenance on memory components such as memory 206 and data cache 316. Maintenance performed by garbage collector 406 may cause the contents of memory locations to be rearranged, as in defragmentation to collect blocks of unused space into larger collections or cleared for further use.

Figure 4:
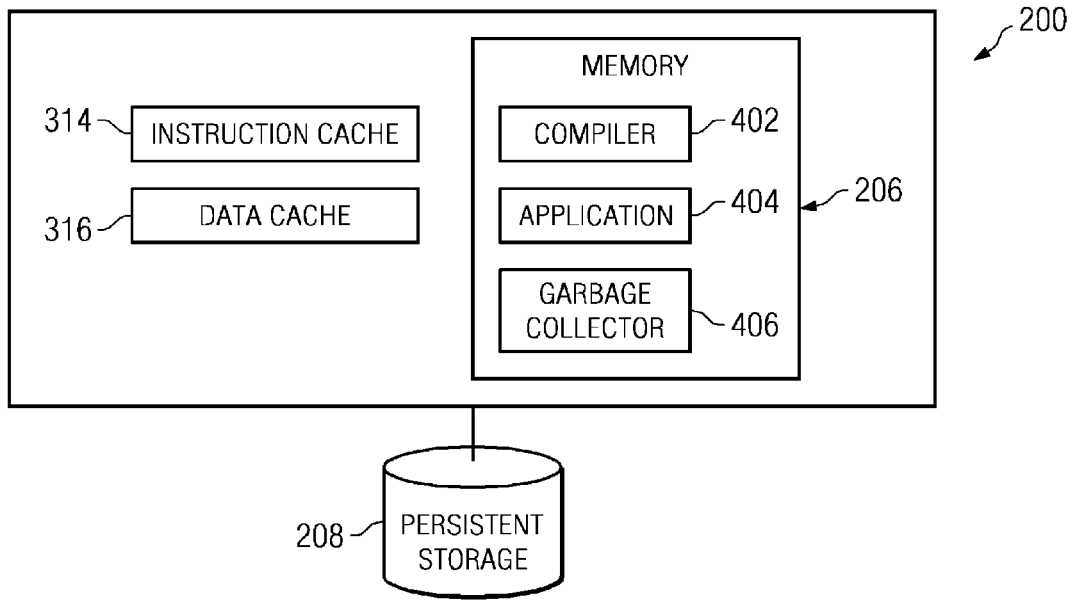
FIG. 4 is a block diagram of a portion of hardware and software components of the data processing system of FIG. 2 in accordance with illustrative embodiments.
Figure 5:
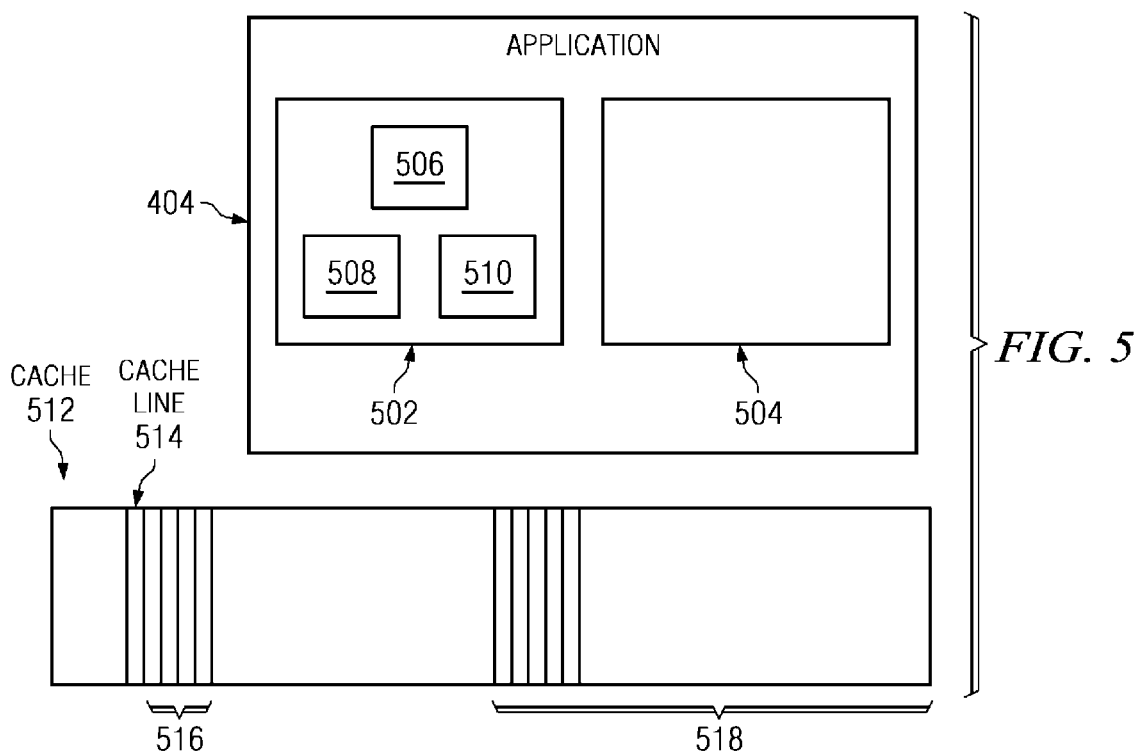
FIG. 5 is a block diagram of cache memory allocation in accordance with illustrative embodiments.

With reference to FIG. 5 a block diagram of cache memory allocation in accordance with illustrative embodiments is shown. Application 404 of FIG. 4 is shown having memory block 502 and memory block 504. Within memory block 502 is further shown sub-allocations of 506, 508 and 510. These allocations may represent application data being processed by application 404 during the course of normal operation. Memory block 502 may have a specified property of reserved while memory block 504 may have a specified property of unreserved.

Cache 512 depicts a contiguous range of memory addresses available, in this case, for maintaining the high speed availability of data to application 404. Cache 512 is further divided into a series of cache lines such as cache line 514. A set of cache lines may further be defined as reserved 516 and another set of cache lines may be defined as unreserved 518 for corresponding use of memory blocks 502 and 504 respectively. Cache 512 may have one or many sections defined as reserved.

Illustrative embodiments provide a memory allocation scheme that ensures a selected allocation is performed at a memory location chosen such that the location would be mapped to a specific cache line. For example, an allocation scheme may further define that sub-allocations of 506, 508 and 510 should move to reserved 516 if and when cached. All selected allocations, therefore, map only to a certain portion of the cache 'reserved' for those allocations. Criteria for selecting allocations, as well as the amount of cache memory to reserve for those allocations, could vary, especially depending on the underlying architecture of the processor.

The allocation scheme of the illustrative embodiments uses the mapping associativity of cache memory to influence memory allocation for improving performance by improving locality. Further, garbage collection is modified to be aware of reserved allocations to improve the placement of objects in a particular manner, thereby helping to control which objects would be evicted from the cache when an object is accessed.

If the selected allocations are objects that are unlikely to be referenced within a short duration of each other, there would typically be a high probability that a cache miss would occur when these objects are accessed regardless of an allocation scheme. Selecting and allocating these objects, given that when the expected cache miss occurs, they evict only other selected objects from the cache, could improve cache utilization for other unselected objects.

Figure 6:
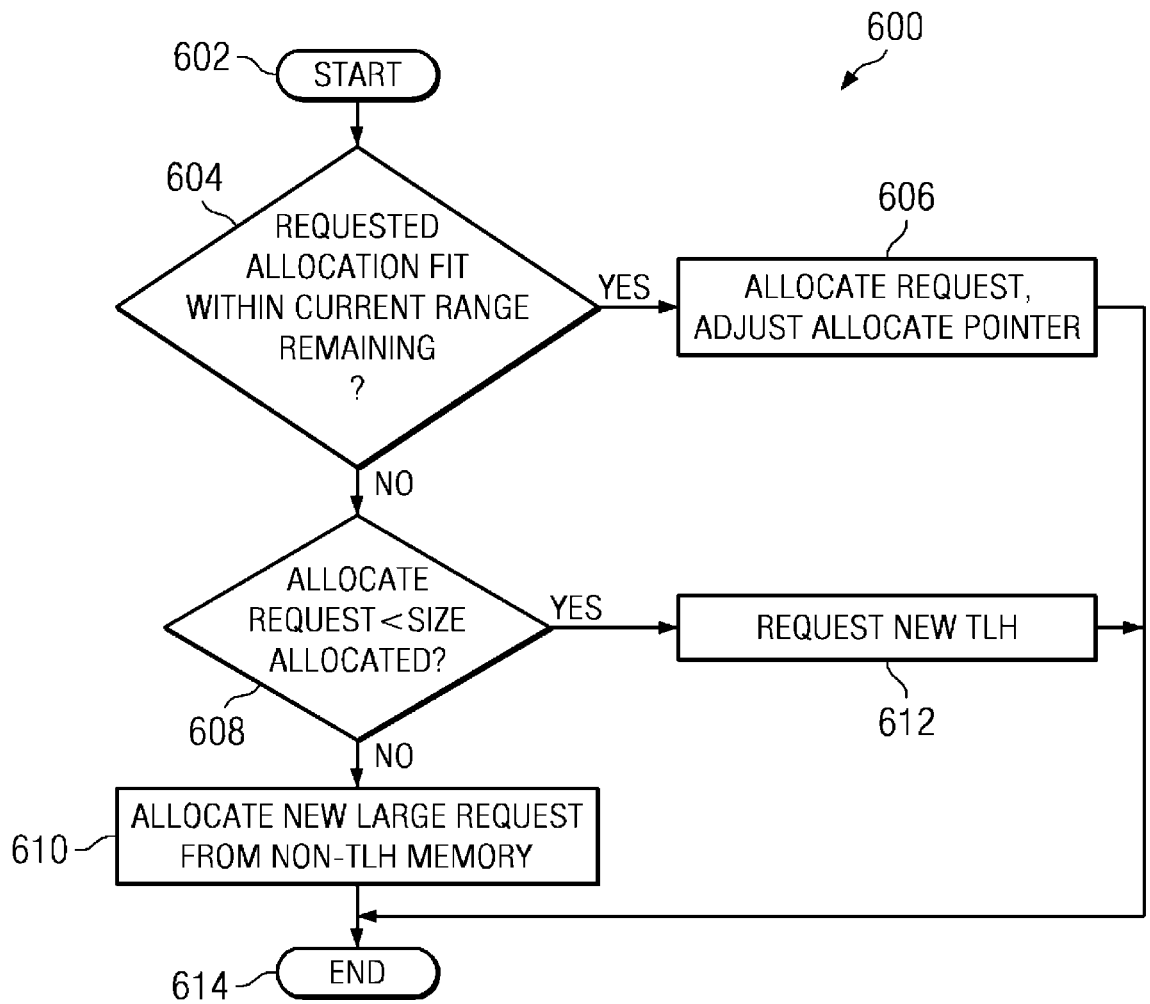
FIG. 6 is a flowchart of typical cache memory allocation.

With reference to FIG. 6 a flowchart of typical cache memory allocation is shown. A simple allocation scheme used conventionally by just-in-time (JIT) compilers is typically based on each thread allocating objects in memory using thread-local heaps (TLH). A thread-local heap is a contiguous chunk of memory of size, tlhSize, demarcated by tlhStart and tlhEnd.

Allocations are made by incrementing a running pointer, tlhAlloc, representing the location at which to perform the next allocation, inside the chunk, by the size requested in the allocation. Objects are allocated in contiguous memory, in succession, within the thread-local heap. When the thread-local heap is first allocated, tlhAlloc is initialized to tlhStart and tlhEnd is initialized to tlhStart+tlhSize.

Process 600 of FIG. 6 is a flowchart of a typical cache memory allocation. Allocation process 600, an example of a process that may be implemented in compiler 402 of FIG. 4, begins (step 602) and determines if a request for allocation of memory fits within the current thread local space remaining (step 604. If there is sufficient space, a "yes" is determined, otherwise there is insufficient space and a "no" is determined. If a "yes" was determined in step 604, the request is allocated and the current allocation pointer is adjusted to reflect the new location (step 606). Process 600 terminates thereafter (step 614).

If a "no" was determined in step 604, then a further determination is made whether the allocate request is less than the size of the allocated heap space (step 608). If there is space, a "yes" would result otherwise a "no" would be returned. If a "yes" was received, then a request for a new thread-local heap is made (step 612). If a "no" was received in step 608, then a request for a new large allocation from non-thread-local heap storage is made (step 610). Process 600 terminates thereafter (step 614).

Figure 7:
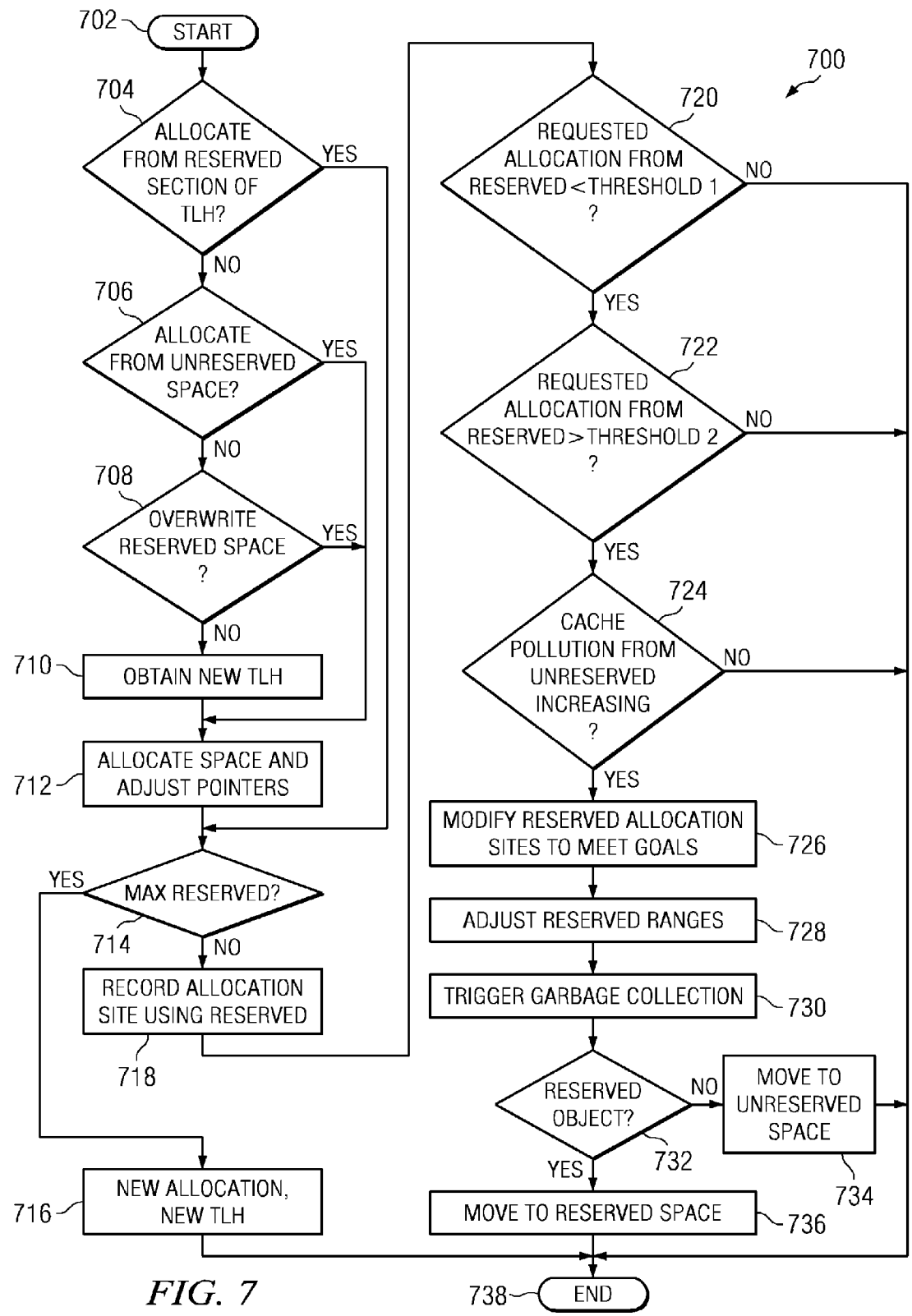
FIG. 7 is a flowchart of an overview of cache memory allocation in accordance with illustrative embodiments.

With reference to FIG. 7 a flowchart of an overview of cache memory allocation in accordance with an illustrative embodiment is shown. An overview of the process of reserved and unreserved space cache allocation in accordance with illustrative embodiments is shown in process 700 of FIG. 7 as may be performed by compiler 402 of FIG. 4.

Process 700 starts (step 702) and determines if the allocation is to be from the reserved portion of the thread-local heap (step 704). If the allocation is to come from the unreserved portion of the cache, a "no" is returned; otherwise a "yes" is returned to indicate allocation is made from the reserved portion. If a "no" was obtained in step 704, a determination is made whether there is space in the unreserved portion (step 706). If there is space a "yes" is obtained, otherwise a "no" is obtained in step 706. If a "yes" was obtained in step 706, the allocation is made, as well as pointer adjustment performed (step 712).

If a "no" was obtained in step 706, a determination is made whether to overwrite a reserved portion (step 708). If a "yes" is obtained, the reserved portion will be overwritten with the new allocation and pointers adjusted thereafter (step 712). Otherwise, a "no" was obtained in step 708 and a request to obtain a new thread-local heap is performed (step 710). Process 700 then allocates and adjusts pointers as needed (step 712).

If a "yes" was obtained in step 704, a determination is made whether the maximum reserved space has been reached (step 714). If a "yes", then a new allocation and a new thread-local heap is requested (step 716) and process 700 terminates thereafter (step 738).

If a "no" was received in step 714, a record is made of the allocation site using a reserved portion (step 718). The allocation request is then compared with a first predetermined value to determine whether the requested space is less than the first predetermined value, for example the size of the reserved portion remaining (step 720). If a "no" is received, processing moves to end (step 738). If a "yes" is received in step 720, a determination is made whether the requested space is more than a second predetermined value, for example the remaining heap space (step 722). If a "no" is received, processing moves to end (step 738). If a "yes" is received in step 722, a determination is made whether the cache pollution, caused by unreserved portion allocations having to overwrite reserved portions, is increasing (step 724). If a "no" is received, processing moves to end (step 738).

If a "yes" was received in step 724, the sites performing reserved allocations are modified to meet the goals of the cache allocation scheme (step 726). Modification of allocation sites is described in a later section of the specification. Adjustment of the reserved ranges is made in accordance with the changes made (step 728). Changes may include number of cache lines used for reserved portions and number of reserved portions as well as required pointer adjustments to reflect any changes performed.

Garbage collection is then triggered to perform maintenance on the cache (step 730). Garbage collection may move objects or delete objects as required. The garbage collection process is enhanced to determine if an object to be relocated is a reserved object (step 732). If a "yes" is determined in step 732, the object is moved to a reserved space (step 736); otherwise a "no" would be obtained in step 732. Having obtained a "no" in step 732, the object belongs in an unreserved portion of the cache and is moved accordingly (step 734). Process 700 terminates thereafter (step 738).

Figure 8:
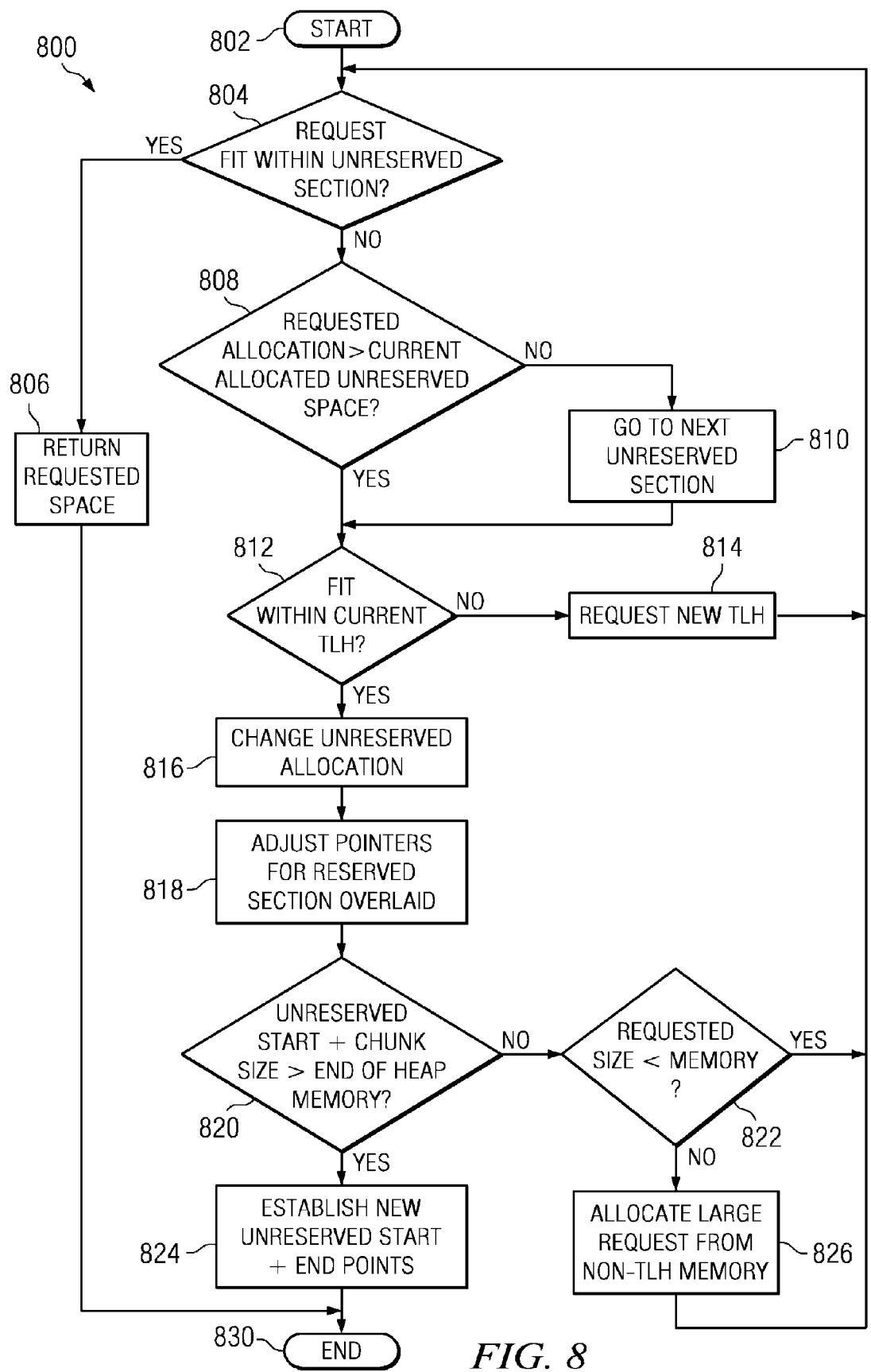
FIG. 8 is a flowchart of unreserved cache memory allocation in accordance with illustrative embodiments.

With reference to FIG. 8, a flowchart of unreserved cache memory allocation in accordance with illustrative embodiments is shown. Process 800, is an example as may be performed by compiler 402 of FIG. 4, to allocate an unreserved portion of cache memory in accordance with illustrative embodiments, begins (step 802) and determines if a requested allocation fits within the unreserved section (step 804). If the allocation fits, a "yes" is returned and the allocated space is returned (step 806). If the allocation does not fit, a "no" is returned and a determination is made whether the requested allocation is greater than the current allocated unreserved space (step 808).

If a "no" was obtained in step 808 use of another unreserved section is requested (step 810). If a "yes" was obtained in step 808, a determination is made whether the allocation fits within the thread-local heap (step 812). If the result is a "no" in step 812, a request for a new thread-local heap is created (step 814). If a "yes" is obtained in step 812, change the unreserved allocation (step 816) and adjust pointers due to the reserved section overlaid by the just expanded unreserved portion (step 818).

A determination is made whether the combination of the unreserved start location plus the chunk size is greater than the end of the heap memory (step 820). If the response is "no" in step 820, a determination is made whether the requested size of the allocation is less than the heap memory (step 822). If the result was "yes" in step 820, new unreserved start and end points are established (step 824) and process 800 terminates thereafter (step 830).

If the result of step 822 was a "yes", process 800 would revert to step 802. If a "no" was received in step 822, a large allocation from the non-thread-local heap memory would be requested (step 826) and the process 800 would revert to step 802.

Figure 9:
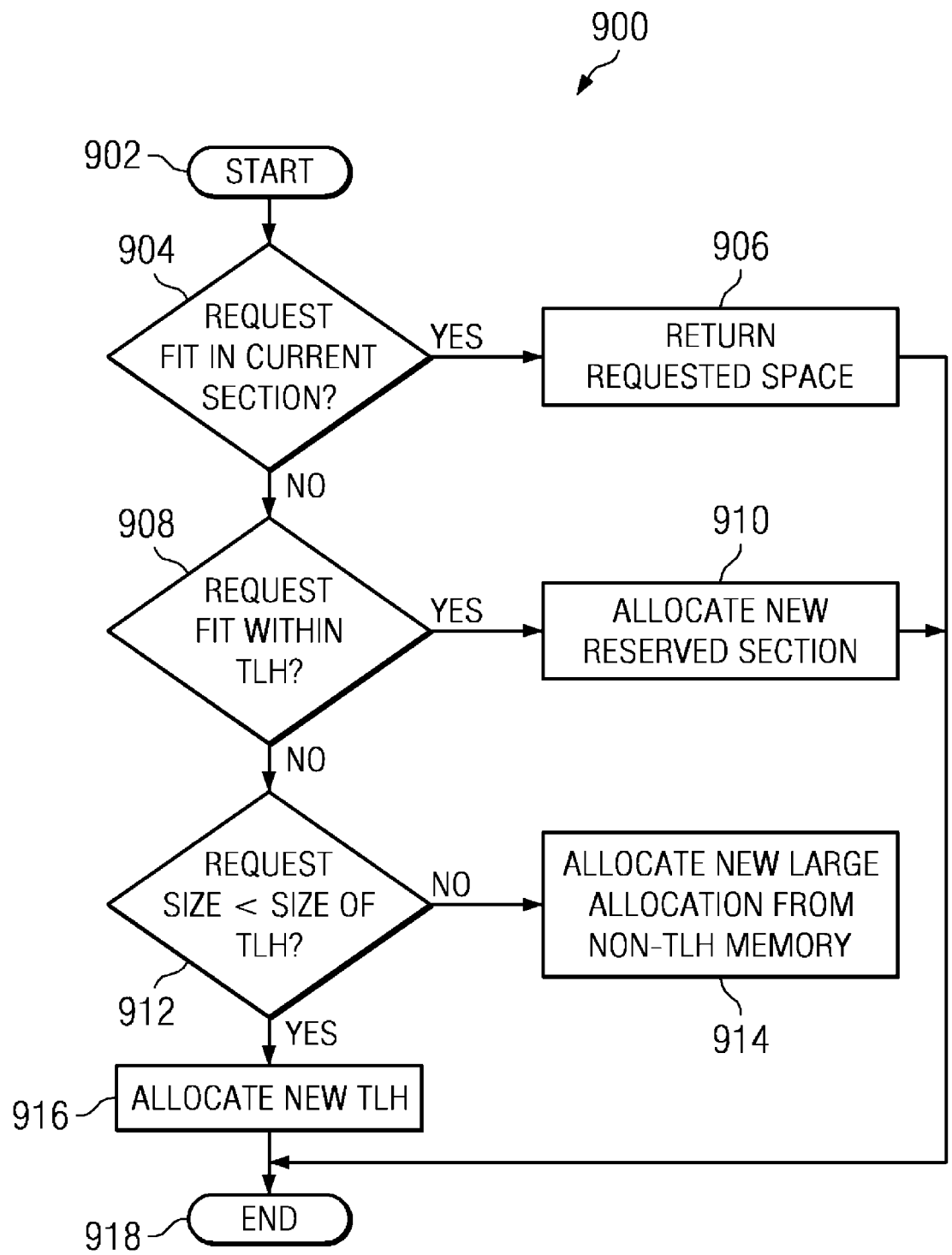
FIG. 9 is a flowchart of reserved cache memory allocation in accordance with illustrative embodiments.

With reference to FIG. 9 a flowchart of reserved cache memory allocation in accordance with illustrative embodiments is shown. Process 900, for example may be performed by compiler 402 of FIG. 4, to allocate a reserved portion of cache memory in accordance with illustrative embodiments begins (step 902) and determines if a requested allocation fits within the reserved section (step 904). If the result of step 904 is "yes", the requested space is returned to the requester (step 906). Process 900 terminates thereafter (step 918).

If the response in step 904 was a "no", a determination is made whether the requested allocation fits within the thread-local heap allocation (step 908). If the response is "yes", a new reserved section is created (step 910). Process 900 terminates thereafter (step 918). If the response was a "no" in step 908, a determination is made whether the requested allocation size is less than the size of the thread-local heap allocation (step 912). If the response to step 912 is "no", an allocation of a new large allocation from non-thread-local heap memory is performed (step 914). Process 900 terminates thereafter (step 918).

If the response in step 912 was "yes", a new allocation of a thread-local heap would be performed (step 916). Process 900 terminates thereafter (step 918).

With reference to FIG. 10, a pseudo-code example of a typical allocation is shown. The allocation process was previously depicted in process 600 of FIG. 6 as may have been implemented by compiler 402 of FIG. 4. Pseudo-code 1000 comprises a determination operation in which is determined whether the requested allocation fits within the current memory space, line 1002. If necessary a further determination is made regarding whether the requested space is less than the allocated heap space, line 1004. If the determination of line 1004 was "yes", then a new thread-local heap is requested, line 1006. If however, a "no" was received in line 1004, then a new allocation from non-thread local heap storage is made, line 1008.

With reference to FIG. 11, a pseudo-code example of allocation definitions in an illustrative embodiment is shown. Pseudo-code 1100 provides definitions for use in allocations as used in illustrative embodiments. In proposed allocation schemes in accordance with illustrative embodiments, each thread-local heap is divided into an unreserved section and one or more, reserved sections. Selected allocations are performed only from designated reserved sections whereas all other allocations are done from the unreserved section.

The size of the unreserved section and each reserved section in the set of reserved sections within a thread-local heap depends on the size and mapping of the cache on the computer on which the program is being executed and the proportion of the cache that is to be reserved for the selected allocations.

Each thread-local heap may be conceptually viewed as being partitioned into smaller chunks, where each smaller chunk has a size represented by chunkSize. The value for chunkSize is determined by dividing the total size of the cache (in bytes) by a value "N", where "N" is the associativity of the cache.

Each chunk, further, has a property wherein accessing a specific memory location within the chunk would not evict any other memory location within the same chunk from the cache. In other words, each chunk can fit exactly within the cache and different memory locations within the chunk are mapped to different memory locations on the cache. Reservation is done by selecting certain specific memory locations within chunks such that those memory locations always map to the same cache line(s) on the computer, as in direct mapping.

The maximum number of reserved sections a thread-local heap may be subdivided into is typically fixed at some small quantity, defined as maxReservedTlhSections. The number of active reserved sections may change throughout the lifetime of an application and the current number is represented by numActiveReservedTlhSections.

A chunk proportion is a fraction of the total cache lines in a chunk with a property that the sum of the proportions is one, and shown in line 1102 of FIG. 11. One or more reserved proportions may be zero and cache lines in each section are consecutive.

For example, with reference to the pseudo-code of FIG. 11, assume that the size of the thread-local heap is a multiple of chunkSize. The number of chunks and the number of lines of cache may be determined as shown in line 1104 and 1106 respectively. Further memory for reserved and unreserved sections may be determined as shown in lines 1108 and 1110 respectively. The total reserved chunk size may then be determined as shown in line 1112.

For example, assume that the first unreservedchunkSize memory locations within a chunk are used for performing unreserved allocations and the next totalReservedchunkSize memory locations within a chunk are used for performing reserved allocations. For each section within a thread-local heap, the location of where the next reserved allocation should occur, represented by reservedTlhAlloc[n], and where the next unreserved allocation, represented by unreservedTlhAlloc, should occur is tracked. A running pointer for each, next allocation is provided, as well as, a pointer to the end of each reserved section (reservedTlhEnd[n]) and unreserved section (unreservedTlhEnd) from which allocations are currently made.

The start of the reserved, reservedTlhStart[n], and unreserved, unreservedTlhStart, sections are used to perform allocations currently within the thread-local heap. When a thread-local heap is first allocated, unreservedTlhStart and unreservedTlhAlloc are initialized to tlhStart and reservedTlhStart [0] and reservedTlhAlloc[0] are initialized to tlhStart+unreservedchunkSize. Each remaining reserved section is then initialized as shown in line 1114.

Further, the unreserved section end, unreservedTlhEnd, is initialized as unreservedTlhStart+unreservedchunkSize and the reserved section end, reservedTlhEnd[n], is initialized to reservedTlhStart[n]+reservedchunkSize[n], where n ranges from 0. . . maxReservedTlhSections-1. The ranges of cache line offsets within each chunk are defined as shown in lines 1116.

With reference to FIGS. 12A, 12B and 12C a pseudo-code example of an unreserved allocation in an illustrative embodiment is shown. A pseudo-code representation 1200 of the previously described process 800 of FIG. 8 to create an "unreserved" allocation of size "s" is depicted by way of example in accordance with illustrative embodiments.

For example, a determination is made whether a requested allocation fits within a reserved section, lines 1202. If the allocation does not fit, a further determination is made whether the allocation request is greater than the allocated unreserved space, lines 1204. Another determination may be made to determine whether the allocation fits within the thread-local heap. If not a request for a new thread-local heap is created, otherwise a change is made to the reserved allocation and associated pointers are adjusted, as in lines 1206. Next is determined whether the combination of the unreserved start location plus the chunk size is greater than the end of the heap memory. If the request can be accommodated within the allocated heap memory the unreserved start and end points are established otherwise a large allocation from non-thread-local heap memory is requested, as in lines 1208.

With reference to FIG. 13, a pseudo-code example of a reserved allocation in an illustrative embodiment. A representation of the previously described process 900 of FIG. 9 for a reserved allocation of size "s" from a reserved section "n", using pseudo-code 1300, may be seen in the following example in accordance with illustrative embodiments. The allocation of reserved sections creates a set of one or more reserved sections.

A determination is made whether the requested allocation fits within the reserved section, lines 1302. Another determination is made, lines 1304, to determine whether the requested allocation fits within the thread-local heap. If the allocation request fits, a new reserved section is created. A determination is then made to determine whether the allocation request fits within the current thread local heap. If the allocation fits, a new thread-local heap is requested, lines 1306. If the allocation does not fit, a request for a new large memory from non-thread local memory is made, lines 1308.

Possible criteria for selecting allocations to reserve cache lines may use either static or dynamic criteria. Sample typical criteria that may be practical and yield performance benefits include the following examples. In one example, if there are allocations of frequently instantiated types, such as a large number of objects created of a certain type, there is typically a high probability that many of the allocated objects will be short lived. Therefore, it is likely that cache lines utilized for objects of that type can be reserved and reused. This form of allocation may be considered as type based cache line reservation.

In another example, if allocations are requested from a frequently executed allocation site, as determined through profiling or heuristics, then cache lines utilized for objects of that type may be reserved and reused. This form of allocation may be considered as a site based cache line reservation.

By way of another example, if it is known that allocations are unlikely to co-exist, such as objects created at certain sites are unlikely to co-exist with objects created at certain other sites. Having this knowledge enables cache lines utilized for objects allocated at the two sites to be reserved and reused. This type of allocation may be considered as object lifetime based cache line reservation. A special case instance may be when objects are allocated but the lifetime ends almost immediately, thereby producing extremely short lived objects. In such cases, by definition these objects will usually not co-exist with other objects.

Another example refers to allocation of mostly written objects. In this example, objects are typically only written into, such as log buffers. These objects would typically benefit from an exclusive cache line state. It is typically more expensive for a cache nest to be moved from a non-exclusive state to an exclusive state. Therefore, predicating the destination of written data to cache lines, for which the cost of exclusivity has already been paid, is typically beneficial. This type of allocation may be considered as mostly written cache line reservation.

Allocation performed by different threads is another example of allocation criteria. In this example, objects allocated by, and potentially only used by, a certain thread may be allocated in a thread unique manner. This allocation may be useful in scenarios where multiple threads running on different processors are primarily operating on their own thread-local data. This form of allocation may be considered as thread based cache line reservation.

Choosing the number of cache lines to reserve in a section is based on a number of factors. These factors typically include the expected number of allocation sites allocating from this reserved section, the size of the objects to be allocated, the effectiveness of any software pre-fetching strategy, and the runtime overhead of managing the thread-local heap pointers to restrict allocations. In all cases, the number of cache lines to reserve should at least be capable of containing any of the objects chosen to be allocated in this reserved section.

Determining whether to have an allocation site allocate from a reserved section of the thread-local heap may be performed when the allocation site containing method is compiled. If maxReservedTlhSections are currently reserved, then the site cannot be considered for cache line reservation. Otherwise, the allocation code is generated to allocate from one of the available reserved sections on the thread-local heap, rather than from the default unreserved section. Each site allocating from a particular reserved section should be recorded to enable efficient cancellation in the event the object allocation patterns in the application change.

When creating an allocation site to use a new reserved section of the cache, benefits of the allocation may not be realized until after the next garbage collection cycle occurs. The benefit is realized later because, neither the current layout of objects on the heap nor the future thread-local heap allocations done by each thread, will respect the new reservation boundaries. Objects will be rearranged the next time they are copied or compacted, such as when the garbage collection occurs. Therefore, when a new site for reserved allocations has been selected, a garbage collection is triggered immediately.

If cache usage relies on a pre-fetch strategy, there may be a need to provide an alteration to the pre-fetch strategy. Pre-fetch instructions are normally used in order to reduce the overhead of incurring a cache miss when an allocation occurs. In a normal allocation scheme, it is usually clear which memory locations should be pre-fetched since the allocation is done by incrementing a single pointer by the amount of memory required for the current allocation. However when using allocation schemes comprising reserved and unreserved sections, the pre-fetch strategy needs to be altered somewhat since the memory locations to be pre-fetched could be either for reserved allocations or for unreserved allocations.

Interaction with garbage collection routines may also need adjustment. A garbage collector may move objects on the heap in the course of copying live objects or compacting the heap space. To more effectively maintain the cache benefits after objects have been carefully allocated, the garbage collector should be made aware of the distinction between unreserved and reserved cache lines. Consequently, objects allocated in the unreserved space should be moved to a space that maps to the unreserved cache lines. Similarly, objects allocated in a reserved space should be relocated to a space that maps to the same reserved cache lines.

In addition, cancellation policies may be revised when using the prescribed cache allocation schemes. A decision to allocate certain objects from reserved areas of the thread-local heap may need to be revisited as an application evolves. It may become desirable to cancel an existing reserved allocation because its allocation sites become rarely executed, or even non-existent, or to allow another site to make use of the reserved lines if it is deemed more beneficial, or to perhaps reclaim some lines for the unreserved allocations.

Typical criteria for evaluating the effectiveness of each reservation may comprise selections from the following examples. If the number of requests to allocate a new thread-local heap that originates from a reserved allocation site falls below a predetermined threshold then this may be an indication that the associated allocations are no longer important.

If the number of requests to allocate a new thread-local heap that originates from a reserved allocation site increases above a predetermined threshold then this may be an indication that allocation and thread-local heap pointer management costs are impacting runtime performance. This may also have ancillary effects such as consuming page table resources that affect access to unreserved objects.

If there is an increase in the number of cache polluting allocations for unreserved objects, then the effectiveness of the reservation scheme will typically be diminished. The effectiveness of each reserved section can be evaluated each time garbage collection is performed. For allocations deemed ineffective or unnecessary, cancellation may be performed by visiting each site allocating from the respective reserved section and modifying the allocation to allocate from the unreserved section instead. This type of cancellation should occur before the next garbage collection proceeds to ensure proper location of the allocation.

If one or more reserved allocations are cancelled, the values in the reservedTlhLinesLow and reservedTlhLinesHigh ranges will be recomputed for the remaining reserved sections to free up as much contiguous space for the unreserved section as possible.

In the allocation scheme just described each thread-local heap was divided into an unreserved section and one, or many, reserved sections. Selected allocations are performed only from designated reserved sections whereas all other allocations are done from the unreserved section.

The size of the unreserved section and each reserved section within a thread-local heap depends on the size and mapping of the cache, on the computer that the program is being executed on, and the proportion of the cache that is to be reserved for the selected allocations. Each thread-local heap should be conceptually viewed as being partitioned into smaller chunks, where each smaller chunk has a size represented by chunkSize=(total size of the cache in bytes)/N (where N is the associativity of the cache). Each such chunk, further, has the property that, accessing a given memory location within the chunk, would not evict any other memory location within the same chunk from the cache. In other words, each chunk can fit exactly within the cache and different memory locations within the chunk are mapped to different memory locations in the cache. Reservation is done by selecting certain specific memory locations within chunks such that those memory locations always map to the same cache line(s) on the computer.

The memory is thus divided into an unreserved section and one or more reserved sections, with selected allocations of the memory only allocated from the one or more reserved sections, and un-selected allocations of the memory allocated from the unreserved section. A specified selected allocation of the memory is then mapped to a same corresponding line of the cache memory each time the mapping for the specified selected allocation of the memory is performed, thereby maintaining locality.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing cache line reservations in a cache memory, the computer implemented method comprising:

dividing a memory into an unreserved section and a set of reserved sections;

performing a selected allocation of the memory only from the set of reserved sections;

performing an un-selected allocation of the memory from the unreserved section; and mapping a specified selected allocation of the memory to a same corresponding cache line within a plurality of cache lines in a reserved section of the cache memory each time mapping for the specified selected allocation of the memory occurs.

2. The computer implemented method of claim 1 wherein performing one of the selected allocations and un-selected allocations further comprises initiating a garbage collection on the memory.

3. The computer implemented method of claim 2 wherein initiating the garbage collection on the memory further comprises:

determining whether to move the allocations and responsive to determining to move the allocations, moving according to which type of section the allocations belong.

4. The computer implemented method of claim 1 wherein the performing selected allocations further comprises:

determining whether the selected allocation exceeds a reserved maximum and responsive to exceeding a reserved maximum, requesting a new allocation in a new memory; otherwise recording an indication of a program site allocation.

5. The computer implemented method of claim 1 wherein the performing the selected allocation of the memory further comprises:

responsive to determining that the selected allocation of the memory is less than a first threshold, canceling the selected allocation of the memory from a reserved section in the set of reserved sections for a program allocation site;

responsive to determining that the selected allocation of the memory is greater than a second threshold, requesting a larger allocation; and adjusting reserved ranges.

6. The computer implemented method of claim 1 wherein the performing the un-selected allocation of the memory further comprises:

determining whether cache pollution caused by unreserved section allocations overwriting reserved section allocations is increasing;

responsive to determining that the cache pollution caused by the unreserved section allocations overwriting the reserved section allocations is increasing, repartitioning the memory; and adjusting reserved ranges.

7. A data processing system for managing cache line reservations in a cache memory, the data processing system comprising:

a bus;

a memory connected to the bus;

a storage device connected to the bus, wherein the storage device contains computer executable program code;

a processor unit connected to the bus, wherein the processor unit executes the computer executable program code to:

divide the memory into an unreserved section and a set of reserved sections;

perform a selected allocation of the memory only from the set of reserved sections;

perform an un-selected allocation of the memory from the unreserved section; and map a specified selected allocation of the memory to a same corresponding cache line within a plurality of cache lines in a reserved section of the cache memory each time the mapping for the specified selected allocation of the memory occurs.

8. The data processing system of claim 7 wherein the processor unit executes the computer executable program code to perform one of the selected allocations and un-selected allocations further comprises:
   initiating a garbage collection on the memory.

9. The data processing system of claim 8 wherein the processor unit executes the computer executable program code to initiate the garbage collection on the memory further comprises:
   determining whether to move the allocations and responsive to determining to move the allocations, moving according to which type of section the allocations belong.

10. The data processing system of claim 7 wherein the processor unit executes the computer executable program code to perform selected allocations further comprises:
   determining whether the selected allocation exceeds a reserved maximum and responsive to determining a reserved maximum exceeded, requesting a new allocation in a new memory;
otherwise recording an indication of a program site allocation.

11. The data processing system of claim 7 wherein the processor unit executes the computer executable program code to perform the selected allocation of the memory further comprises:
   responsive to determining that the selected allocation of the memory is less than a first threshold, canceling the selected allocation of the memory from a reserved section in the set of reserved sections for a program allocation site;
   responsive to determining that the selected allocation of the memory is greater than a second threshold, requesting a larger allocation; and
   adjusting reserved ranges.

12. The data processing system of claim 7 wherein the processor unit executes the computer executable program code to perform the un-selected allocation of the memory further comprises:
   determining whether cache pollution caused by unreserved section allocations overwriting reserved section allocations is increasing;
   responsive to determining that the cache pollution caused by the unreserved section allocations overwriting the reserved section allocations is increasing, repartitioning the memory; and
   adjusting reserved ranges.

13. A computer program product for managing cache line reservations in a cache memory, the computer program product comprising:
   a computer usable recordable medium having computer executable program code embodied thereon, the computer executable program code comprising:
   computer executable program code for dividing a memory into an unreserved section and a set of reserved sections;
   computer executable program code for performing a selected allocation of the memory only from the set of reserved sections;
   computer executable program code for performing an un-selected allocation of the memory from the unreserved section; and
   computer executable program code for mapping a specified selected allocation of the memory to a same corresponding cache line within a plurality of cache lines in a reserved section of the cache memory each time the mapping for the specified selected allocation of the memory occurs.

14. The computer program product of claim 13 wherein computer executable program code for performing one of the selected allocations and un-selected allocations further comprises:
   computer executable program code for initiating a garbage collection on the memory.

15. The computer program product of claim 13 wherein computer executable program code for initiating the garbage collection on the memory further comprises:
   computer executable program code for determining whether to move the allocations and computer executable program code responsive to determining to move the allocations, for moving according to which type of section the allocations belong.

16. The computer program product of claim 13 wherein computer executable program code for performing selected allocations further comprises:
   computer executable program code for determining if the selected allocation exceeds a reserved maximum and computer executable program code responsive to exceeding a reserved maximum, for requesting a new allocation in a new memory; otherwise recording an indication of a program site allocation.

17. The computer program product of claim 13 wherein computer executable program code for performing the selected allocation of the memory further comprises:
   computer executable program code responsive to determining that the selected allocation of the memory is less than a first threshold, for canceling the selected allocation of the memory from a reserved section in the set of reserved sections for a program allocation site;
   computer executable program code responsive to determining that the selected allocation of the memory is greater than a second threshold, for requesting a larger allocation; and
   computer executable program code for adjusting reserved ranges.

18. The computer program product of claim 13 wherein the computer executable program code for performing the un-selected allocation of the memory further comprises:
   computer executable program code for determining whether cache pollution caused by unreserved section allocations overwriting reserved section allocations is increasing;
   computer executable program code responsive to determining that the cache pollution caused by the unreserved section allocations overwriting the reserved section allocations is increasing, for repartitioning the memory; and
   computer executable program code for adjusting reserved ranges.

* * * * *